US007891820B2

(12) United States Patent
Hsiao et al.

(10) Patent No.: US 7,891,820 B2
(45) Date of Patent: Feb. 22, 2011

(54) PROJECTOR AND METHOD FOR IGNITING LAMP

(75) Inventors: Chi-Hung Hsiao, Taoyuan (TW); Chun-Ming Shen, Taoyuan (TW); Ke-Chun Chuang, Taoyuan (TW)

(73) Assignee: BenQ Corporation, Taipei (TW)

( * ) Notice: Subject to any disclaimer, the term of this patent is extended or adjusted under 35 U.S.C. 154(b) by 635 days.

(21) Appl. No.: 11/874,946

(22) Filed: Oct. 19, 2007

(65) Prior Publication Data

US 2008/0158517 A1 Jul. 3, 2008

(30) Foreign Application Priority Data

Dec. 29, 2006 (TW) .............................. 95150073 A

(51) Int. Cl.
*G03B 21/18* (2006.01)
(52) U.S. Cl. .............................. 353/57; 353/58; 353/60; 353/61; 353/85; 353/72; 353/87; 353/122; 315/176; 315/220; 315/222; 315/239; 315/277; 315/290; 315/291; 315/307; 315/308; 315/309; 348/744; 348/E5.137; 348/E9.027
(58) Field of Classification Search .................. 353/57, 353/58, 60, 61, 122, 87, 85, 72, 121; 352/139, 352/140, 198, 202, 203; 315/176, 220, 290, 315/222, 239, 277, 278
See application file for complete search history.

(56) References Cited

U.S. PATENT DOCUMENTS

| | | | | |
|---|---|---|---|---|
| 5,136,397 A | * | 8/1992 | Miyashita | 348/748 |
| 6,467,911 B1 | * | 10/2002 | Ueyama et al. | 353/87 |
| 6,472,828 B1 | * | 10/2002 | Pruett et al. | 315/225 |
| 6,979,960 B2 | * | 12/2005 | Okawa et al. | 315/291 |
| 7,441,903 B2 | * | 10/2008 | Kim | 353/61 |
| 7,448,759 B2 | * | 11/2008 | Fukano | 353/85 |
| 7,625,092 B2 | * | 12/2009 | Ahn | 353/85 |
| 2007/0046904 A1 | * | 3/2007 | Rudolph et al. | 353/85 |
| 2007/0126374 A1 | * | 6/2007 | Haruna et al. | 315/291 |
| 2008/0018863 A1 | * | 1/2008 | Hsiao | 353/54 |

* cited by examiner

*Primary Examiner*—Georgia Y Epps
*Assistant Examiner*—Sultan Chowdhury

(57) ABSTRACT

The invention discloses a method for igniting a lamp of a projector. The method includes steps of: (a) sensing a first temperature difference in response to power-off of the projector; (b) in response to power-on of the projector, detecting an aftercooling time and judging whether it is smaller than a predetermined cooling time, if YES, perform step (c); otherwise, perform step (g); (c) sensing a second temperature difference; (d) judging whether a ratio of the second temperature difference to the first temperature difference is larger than a threshold, if YES, perform step (e); otherwise, perform step (g); (e) calculating a re-cooling time; (f) controlling a fan to operate for the re-cooling time to cool the lamp down; and (g) igniting the lamp.

21 Claims, 5 Drawing Sheets

PROJECTOR AND METHOD FOR IGNITING LAMP

BACKGROUND OF THE INVENTION

1. Field of the Invention

The invention relates to a method for igniting the lamp of the projector, and more particularly, to a method for igniting a lamp to protect the lamp of the projector.

2. Description of the Prior Art

In the prior art, after the projector is turned off, it should not be restarted until the temperature of the lamp inside is cooled to below a predetermined cooling temperature by a fan for a period of time and on the condition of the power cable of the projector plugged. This procedure is to protect the lifetime of the lamp. However, a user sometimes restarts the projector at the state in which the lamp has not been completely cooled down yet; as a result, it shortens the lifetime of the lamp.

Referring to FIG. 1, FIG. 1 is the graph of the cooling processes under different conditions after power-off of the projector. As shown in FIG. 1, TimeN refers to the required time for the lamp to be cooled to below the predetermined cooling temperature by a natural convection. TimeF refers to the required time for the lamp to be cooled to below the predetermined cooling temperature by a forced convection (i.e. by the fan). TimeC refers to a time point of the forced convection process when the forced convection stops because the power cable of the projector is unplugged or the power in electrical system is cut off. TimeC-TimeC' refers to the required time for the lamp to be cooled to below the predetermined cooling temperature by the natural convection after the forced convection stops. It should be noted that if the user restarts the projector within the time interval TimeC-TimeC', the lamp, not cooled down yet, will be damaged and its lifetime will be shortened.

To solve the aforementioned problem, the main scope of the invention is to provide a method for igniting a lamp to protect the lamp of the projector.

SUMMARY OF THE INVENTION

A scope of the invention is to provide a projector and a method for igniting the lamp of the projector. In response to power-on of the projector under the condition that the lamp is not cooled down yet, a processor controls a fan to operate for a period of time to cool the lamp down first and then ignites the lamp.

According to a preferred embodiment of the invention, the projector includes a casing, a lamp, a fan, a first temperature sensor, a second temperature sensor, and a processor.

The casing has an air inlet. Both of the lamp and the fan are disposed in the casing, and the fan is for cooling the lamp. The first temperature sensor is disposed at the air inlet of the casing, and the second temperature sensor is disposed near the lamp. The processor is coupled to the lamp, the fan, the first temperature sensor and the second temperature sensor, respectively.

In response to power-off of the projector, the first temperature sensor senses a first temperature, and the second temperature sensor senses a second temperature. Subsequently, the processor calculates a first temperature difference between the first temperature and the second temperature.

In response to power-on of the projector, the processor obtains an aftercooling time and judges whether the aftercooling time is shorter than a predetermined cooling time. If YES, the first temperature sensor senses a third temperature, and the second temperature sensor senses a fourth temperature. Besides, the processor calculates the difference of the third temperature and the fourth temperature to obtain a second temperature difference. Otherwise, the processor ignites the lamp directly.

The aforementioned aftercooling time refers to an interval from power-off of the projector to complete loss of power in the projector. Alternatively, the aftercooling time refers to an interval from power-on of the projector switched to next power-on of the projector, i.e. the process of power-on, power-off and then power-on. Completely losing power means that the power cable of the projector is unplugged or the power is lost under all kinds of possibilities.

Subsequently, the processor judges whether the ratio of the second temperature difference to the first temperature difference is larger than a threshold. If YES, the processor calculates a re-cooling time according to the predetermined cooling time, the aftercooling time, the first temperature difference, the second temperature difference and the threshold. Otherwise, the processor ignites the lamp directly.

Afterwards, the processor controls the fan to operate for the re-cooling time in order to cool the lamp first and then ignites the lamp later.

Therefore, according to the projector and the method for igniting the lamp of the projector of the invention, in response to power-on of the projector under the condition that the lamp is not cooled yet, the processor controls the fan to operate for a period of time to cool the lamp first and then ignites the lamp later. Thereby, the lamp of the projector can avoid being damaged for the lamp is not cooled down yet.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 2:
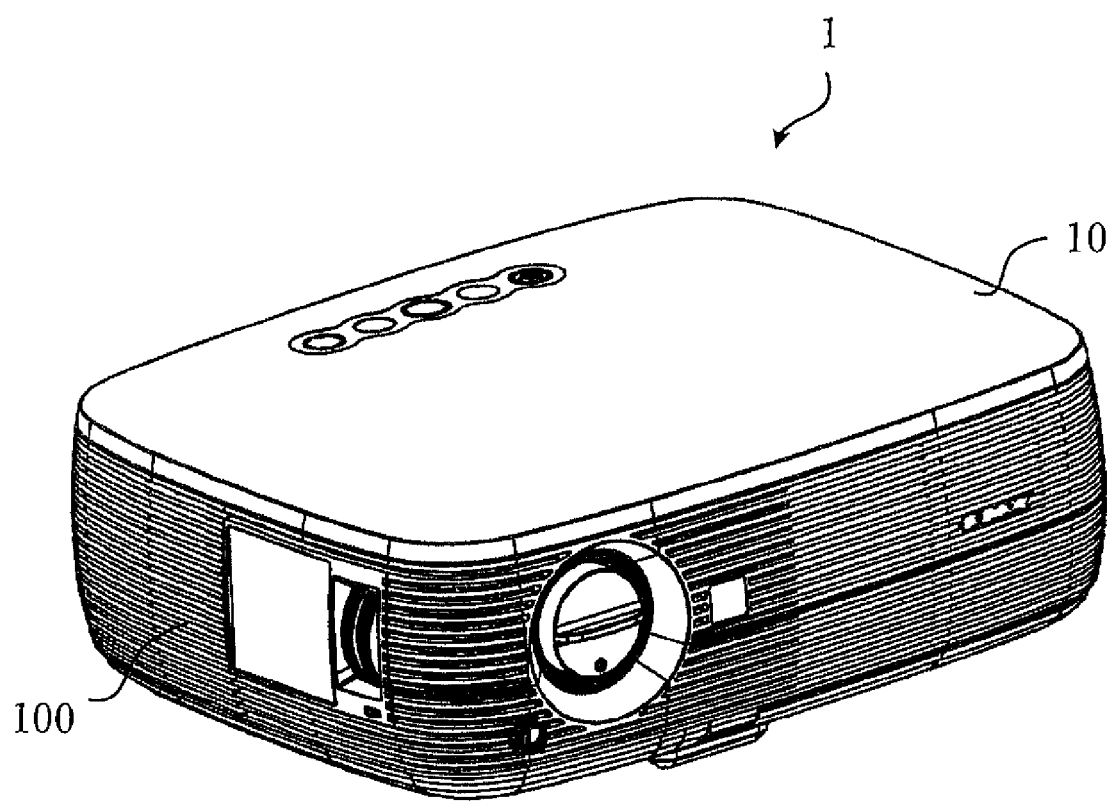
FIG. 2 is an exterior view of the projector according to a preferred embodiment of the invention.
Figure 3:
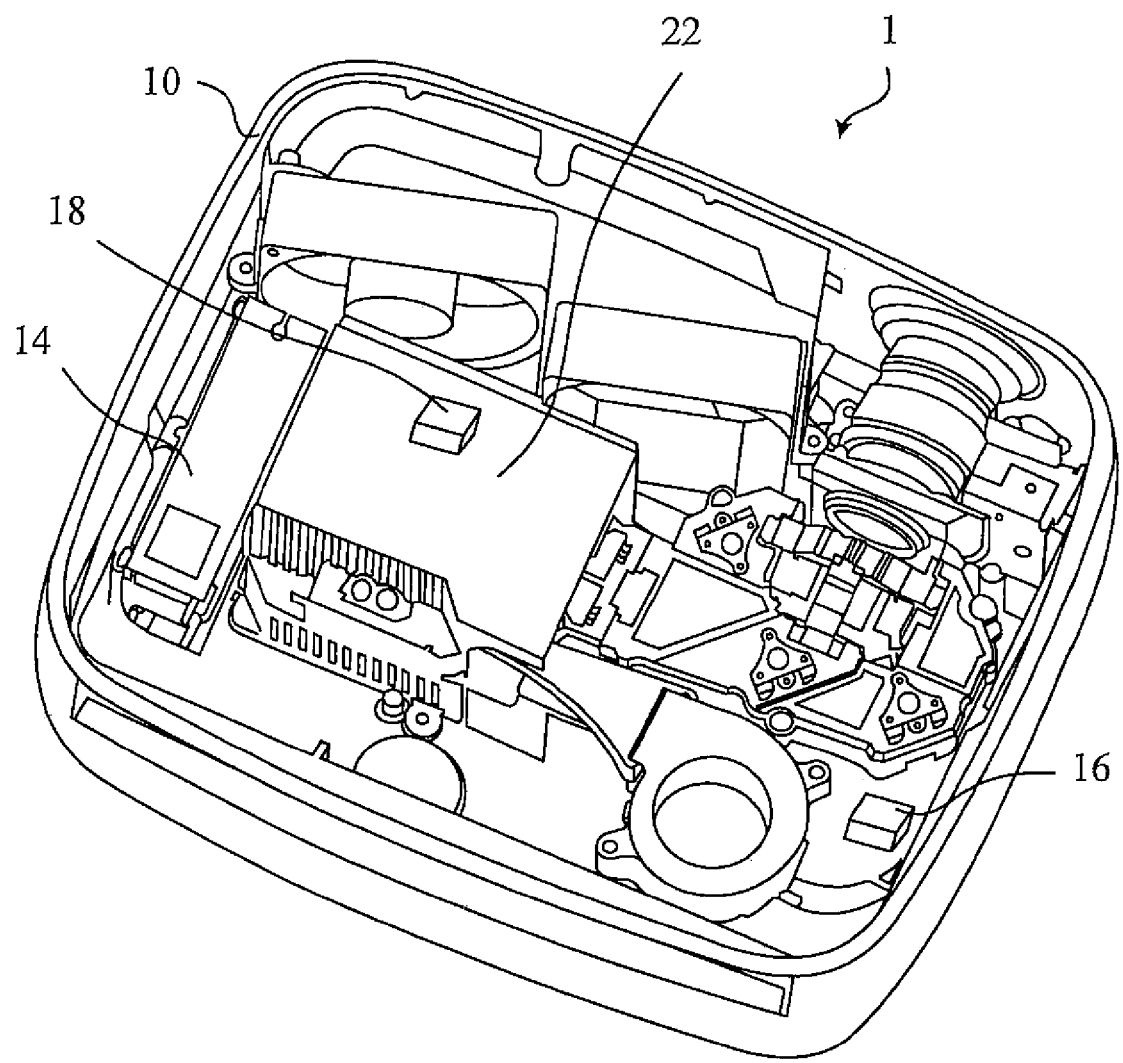
FIG. 3 is an interior view of the projector in FIG. 2.
Figure 4:
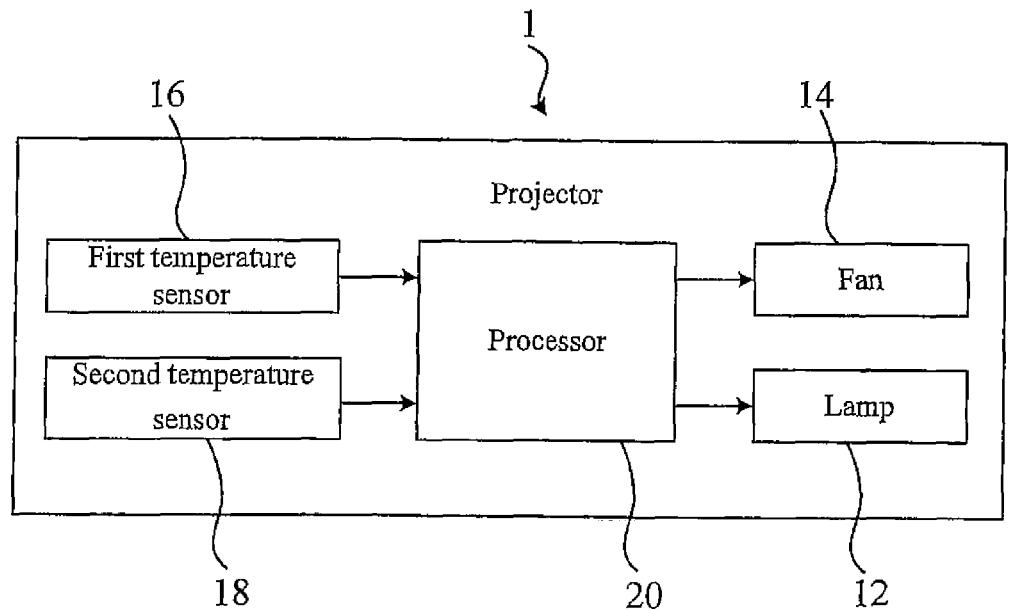
FIG. 4 is a functional block diagram of the projector in FIG. 3.

Please refer FIGS. through 2 to 4. FIG. 2 is an exterior view of the projector according to a preferred embodiment of the invention. FIG. 3 is an interior view of the projector in FIG. 2. FIG. 4 is a functional block diagram of the projector in FIG. 3.

In one preferred embodiment according to the invention, the projector 1 includes a casing 10, a lamp 12, a fan 14, a first temperature sensor 16, a second temperature sensor 18, a processor 20, and a lamp box 22. As shown in FIG. 2, the casing 10 has an air inlet 100. As shown in FIG. 3, the lamp box 22 is disposed in the casing 10, and the lamp 12 (not shown in FIG. 3) is disposed in the lamp box 22. Similarly, the fan 14 is disposed in the casing 10 and is for cooling the lamp 12 in the lamp box 22. The first temperature sensor 16 is disposed at the air inlet 100 of the casing 10, and the second temperature sensor 18 is disposed near the lamp 12. For example, the second temperature sensor 18 can be disposed on the lamp box 22, but not limited therein. As shown in FIG. 4, the processor 20 is electrically coupled to the lamp 12, the fan 14, the first temperature sensor 16 and the second temperature sensor 18, respectively.

Figure 5:
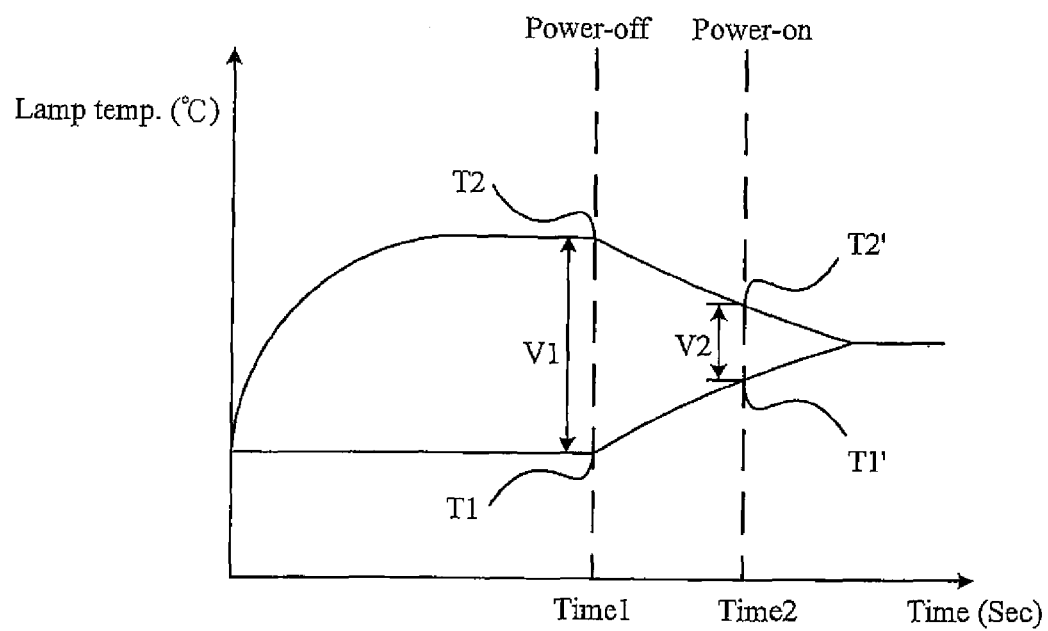
FIG. 5 is the graph of the temperature variation in the lamp of the projector.

Referring to FIG. 5, FIG. 5 is the graph of the temperature variation in the lamp 12 of the projector 1. In the embodiment, when a user turns off the projector 1 (e.g. turns off the power button of the projector 1 with the power cable plugged) at Time1, i.e. in response to power-off of the projector 1 at Time1, the first temperature sensor 16 will sense a first temperature T1, and the second temperature sensor 18 will sense a second temperature T2. At this time, the processor 20 will calculate a first temperature difference V1 (V1=T2−T1) between the first temperature T1 and the second temperature T2.

Figure 1:
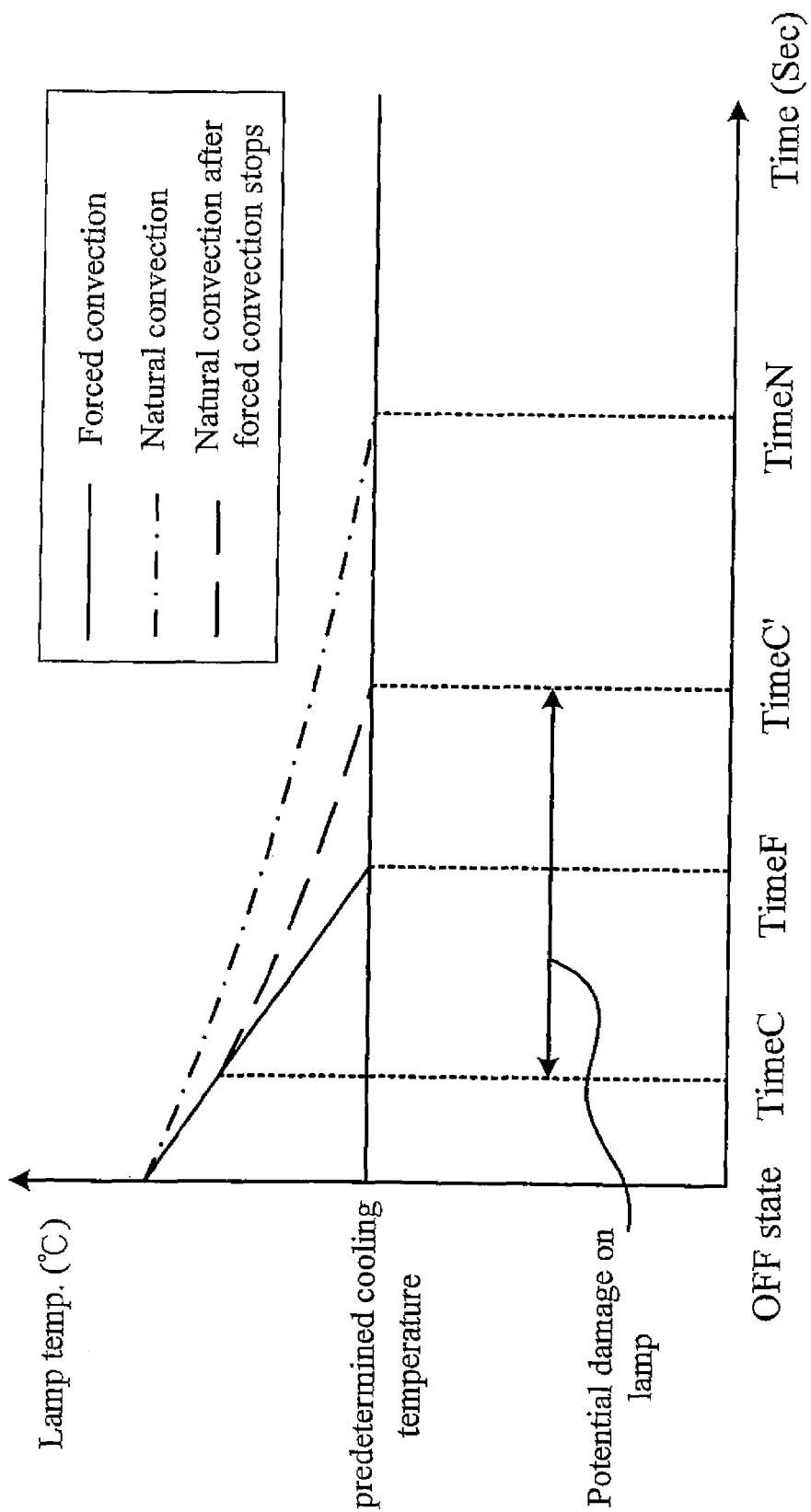
FIG. 1 is the graph of the cooling processes under different conditions after power-off of the projector.

In response to power-on of the projector 1 at Time2, the processor 20 will obtain an aftercooling time TimeA (TimeA=Time2−Time1) and judge whether the aftercooling time TimeA is shorter than a predetermined cooling time. The predetermined cooling time can be set as TimeF shown in FIG. 1, but not limited therein. The aforementioned aftercooling time TimeA represents an interval from power-off of the projector 1 to complete loss of power in the projector 1. Alternatively, the aftercooling time TimeA represents an interval from power-on of the projector 1 switched to next power-on of the projector 1, i.e. the process of power-on, power-off and then power-on. Complete loss of power means that the power cable of the projector is unplugged or the power is lost under all kinds of possibilities.

If the aftercooling time TimeA is larger than the predetermined cooling time, the processor 20 will ignite the lamp 12 directly. If the aftercooling time TimeA is shorter than the predetermined cooling time, the first temperature sensor 16 will sense a third temperature T1', and the second temperature sensor 18 will sense a fourth temperature T2'. Subsequently, the processor 20 will calculate a second temperature difference V2 (V2=T2'−T1') between the third temperature T1' and the fourth T2' temperature.

Subsequently, the processor 20 will judge whether a ratio of the second temperature difference V2 to the first temperature difference V1 is larger than a threshold. If YES, the processor 20 will calculate a re-cooling time TimeB according to the predetermined cooling time TimeF, the aftercooling time TimeA, the first temperature difference V1, the second temperature difference V2 and the threshold. Otherwise, the processor 20 will ignite the lamp 12 directly.

In the embodiment, the re-cooling time TimeB can be calculated according to the following formula:

$$TimeB = (TimeF - TimeA) - \frac{(1 - V2/V1)}{1 - X} * TimeF;$$

where X is the threshold and can be chosen according to practical applications.

Afterwards, the processor 20 will control the fan 14 to operate for the re-cooling time TimeB to cool the lamp 12 first and then ignite the lamp 12 later. Thereby, the lamp 12 of the projector 1 can avoid being damaged for the lamp 12 is not cooled down yet. In the embodiment, after the lamp 12 is cooled by the fan 14 for the re-cooling time TimeB, the processor 20 will update the aftercooling time TimeA to be 0.

In another preferred embodiment, during power-on of the projector 1, the processor 20 will update the first temperature difference V1 periodically while a period is due. Therefore, when power-off of the projector 1 is due to sudden power-cut and then the projector 1 is restarted, the processor 20 can obtain the last first temperature difference V1. It should be noted that the period can be designed according to practical applications.

In another preferred embodiment, the aftercooling time TimeA can be preset to be 0 in the processor 20. Under the situation, for example, that power-off of the projector 1 is due to sudden power-cut in the electrical system, when power-on of the projector 1 is then desired, since the aftercooling time TimeA is shorter than the predetermined cooling time TimeF, the processor 20 will calculate the second temperature difference V2 between the third temperature T1' and the fourth temperature T2', and read the updated first temperature difference V1 which the processor 20 has updated before power-off of the projector 1. Subsequently, the processor 20 will judge whether the ratio of the second temperature difference V2 to the first temperature difference V1 is larger than the threshold. The subsequent operational principle is the same as mentioned above and not repeated herein.

Figure 6:
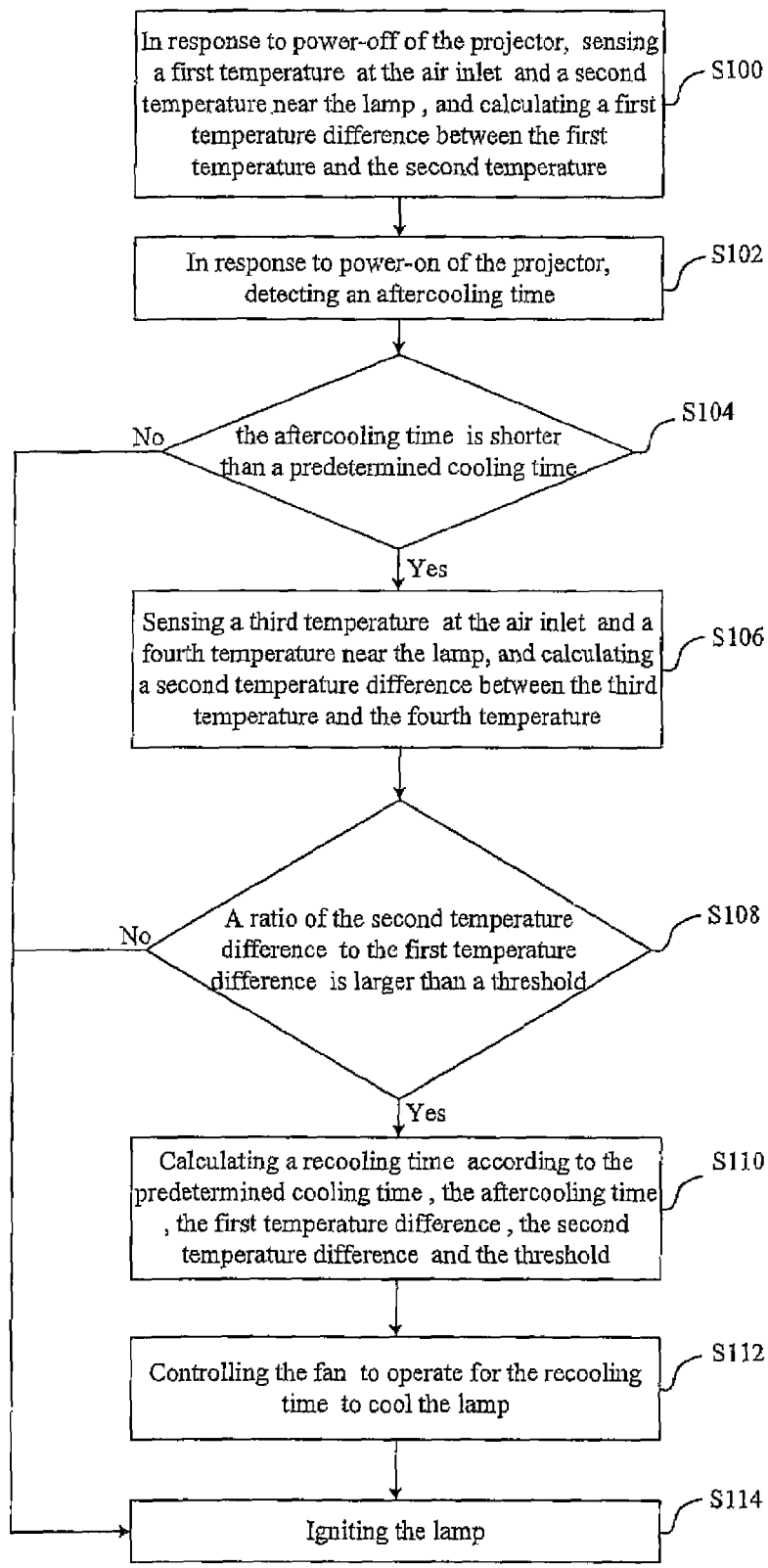
FIG. 6 is a flow chart of the method for igniting the lamp of the projector according to a preferred embodiment of the invention.

Referring to FIG. 6, FIG. 6 is a flow chart of the method for igniting the lamp 12 of the projector 1 according to a preferred embodiment of the invention. Referring to FIGS. through 2 to 5 together as well, the method for igniting the lamp 12 of the projector 1 according to the invention includes the following steps.

First, implementing step S100; in response to power-off of the projector 1, the method senses a first temperature T1 at the air inlet 100 and a second temperature T2 near the lamp 12, and calculates a first temperature difference V1 between the first temperature T1 and the second temperature T2.

Subsequently, implementing step S102; in response to power-on of the projector 1, the method obtains an aftercooling time timeA.

Implementing step S104; the method judges whether the aftercooling time timeA is shorter than a predetermined cooling time TimeF. If YES, the method performs step S106; otherwise, the method performs step S114.

Implementing step S106; the method senses a third temperature T1' at the air inlet 100 and a fourth temperature T2' near the lamp 12, and calculates a second temperature difference V2 between the third temperature T1' and the fourth temperature T2'.

Implementing step S108; the method judges whether a ratio of the second temperature difference V2 to the first temperature difference V1 is larger than a threshold. If YES, the method performs step S110; otherwise, the method performs step S14.

Implementing step S110; the method calculates a re-cooling time TimeB according to the predetermined cooling time TimeF, the aftercooling time TimeA, the first temperature difference V1, the second temperature difference V2 and the threshold.

Implementing step S112; the method controls the fan 14 to operate for the re-cooling time TimeB to cool the lamp 12.

Finally, implementing step S114; the method ignites the lamp 12. According to another preferred embodiment of the invention, the method for igniting the lamp of the projector includes the following steps.

First, in response to power-off of the projector, the method senses a first temperature at the air inlet and a second temperature near the lamp, and calculates a first temperature difference between the first temperature and the second temperature.

Then, in response to power-on of the projector, the method senses a third temperature at the air inlet and a fourth temperature near the lamp, and calculates a second temperature difference between the third temperature and the fourth temperature.

According to the first temperature difference and the second temperature difference, the method calculates a re-cooling time.

Next, the method controls the fan to operate for the re-cooling time to cool the lamp.

Finally, the method ignites the lamp. Other details for each step of this embodiment are similar to what is disclosed in aforementioned embodiments and is not repeated herein.

Compared to the prior art, according to the projector and the method for igniting the lamp of the projector of the invention, in response to power-on of the projector under the condition that the lamp is not cooled down yet, the processor will control the fan to operate for a period of time to cool the lamp first and then ignite the lamp later. Thereby, the lamp of the projector can avoid being damaged for the lamp is not cooled down yet. Furthermore, the invention is suitable to apply whether the projector is turned off rightly or not.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method for igniting a lamp of a projector, the projector also comprising a casing and a fan, the fan being for cooling the lamp, the casing having an air inlet, said method comprising the steps of:
    (a) in response to power-off of the projector, sensing a first temperature at the air inlet and a second temperature near the lamp, and calculating a first temperature difference between the first temperature and the second temperature;
    (b) in response to power-on of the projector, obtaining an aftercooling time, and judging whether the aftercooling time is shorter than a predetermined cooling time, if YES, performing step (c); otherwise, performing step (g);
    (c) sensing a third temperature at the air inlet and a fourth temperature near the lamp, and calculating a second temperature difference between the third temperature and the fourth temperature;
    (d) judging whether a ratio of the second temperature difference to the first temperature difference is larger than a threshold; if YES, performing step (e); otherwise, performing step (g);
    (e) calculating a re-cooling time according to a condition of the ratio, wherein when the ratio is increasing, the calculated re-cooling time is increasing accordingly, when the ratio is decreasing, the calculated re-cooling time is decreasing accordingly;
    (f) controlling the fan to operate for the re-cooling time to cool the lamp; and
    (g) igniting the lamp.

2. The method of claim 1, before step (a), further comprising the step of:
    periodically updating the first temperature difference during power-on of the projector.

3. The method of claim 1, wherein the aftercooling time represents an interval from power-off of the projector to complete loss of power in the projector.

4. The method of claim 1, wherein the aftercooling time represents an interval from power-on of the projector switched to next power-on of the projector.

5. The method of claim 3, wherein if power-off the projector occurs due to power-cut of the projector, the aftercooling time is equal to 0.

6. The method of claim 1, wherein the re-cooling time is calculated according to the following formula:

$$TimeB = (TimeF - TimeA) - \frac{(1 - V2/V1)}{1 - X} * TimeF;$$

wherein TimeB represents the re-cooling time, TimeF represents the predetermined cooling time, TimeA represents the aftercooling time, V1 represents the first temperature difference, V2 represents the second temperature difference, and X represents the threshold.

7. The method of claim 1, wherein step (f) further comprises:
    updating the aftercooling time to be 0 after the lamp is cooled.

8. A projector, comprising:
    a casing, having an air inlet;
    a lamp, disposed in the casing;
    a fan, disposed in the casing, for cooling the lamp;
    a first temperature sensor, disposed at the air inlet of the casing, in response to power-off of the projector, the first temperature sensor sensing a first temperature; in response to power-on of the projector, the first temperature sensor sensing a third temperature;
    a second temperature sensor, disposed near the lamp, in response to power-off of the projector, the second temperature sensor sensing a second temperature;
    in response to power-on of the projector, the second temperature sensor sensing a fourth temperature; and
    a processor, electrically coupled to the lamp, the fan, the first temperature sensor and the second temperature sensor, respectively, in response to power-off of the projector, the processor calculating a first temperature difference between the first temperature and the second temperature; in response to power-on of the projector, the processor obtaining an aftercooling time and judging whether the aftercooling time is shorter than a predetermined cooling time, if NO, the processor igniting the lamp; otherwise, the processor calculating a second temperature difference between the third temperature and the fourth temperature, and then judging whether a ratio of the second temperature difference to the first temperature difference is larger than a threshold, if NO, the processor igniting the lamp; otherwise, the processor calculating a re-cooling time according to a condition of the ratio, wherein when the ratio is increasing, the calculated re-cooling time is increasing accordingly, when the ratio is decreasing, the calculated re-cooling time is decreasing accordingly; afterwards, the processor controlling the fan to operate for the re-cooling time to cool the lamp, and then igniting the lamp.

9. The projector of claim 8, wherein during power-on of the projector, the processor updates the first temperature difference periodically.

10. The projector of claim 8, wherein the aftercooling time represents an interval from power-off of the projector to complete loss of power in the projector.

11. The projector of claim 8, wherein the aftercooling time represents an interval from power-on of the projector switched to a next power-on of the projector.

12. The projector of claim 10, wherein if power-off of the projector occurs due to power-cut of the projector, the aftercooling time is equal to 0.

13. The projector of claim 8, wherein the re-cooling time is calculated according to the following formula:

$$TimeB = (TimeF - TimeA) - \frac{(1 - V2/V1)}{1 - X} * TimeF;$$

where TimeB represents the re-cooling time, TimeF represents the predetermined cooling time, TimeA represents the aftercooling time, V1 represents the first temperature difference, V2 represents the second temperature difference, and X represents the threshold.

14. The projector of claim 8, wherein after the lamp is cooled, the processor updates the aftercooling time to be 0.

15. A method for igniting a lamp of a projector, the projector also comprising a casing and a fan, the fan being for cooling the lamp, the casing having an air inlet, said method comprising the steps of:
   (a) in response to power-off of the projector, sensing a first temperature at the air inlet and a second temperature near the lamp, and calculating a first temperature difference between the first temperature and the second temperature;
   (b) in response to power-on of the projector, sensing a third temperature at the air inlet and a fourth temperature near the lamp, and calculating a second temperature difference between the third temperature and the fourth temperature;
   (c) according to a ratio of the second temperature difference to the first temperature difference, calculating a re-cooling time, wherein when the ratio is increasing, the calculated re-cooling time is increasing accordingly, when the ratio is decreasing, the calculated re-cooling time is decreasing accordingly;
   (d) controlling the fan to operate for the re-cooling time to cool the lamp; and
   (e) igniting the lamp.

16. The method of claim 15, before step (a), further comprising the step of:
   periodically updating the first temperature difference during power-on of the projector.

17. The method of claim 15, wherein calculating the re-cooling time is performed by the step of:
   judging whether the ratio of the second temperature difference to the first temperature difference is larger than a threshold; and if YES, calculating the re-cooling time according to the following formula:

$$TimeB = (TimeF - TimeA) - \frac{(1 - V2/V1)}{1 - X} * TimeF;$$

wherein TimeB represents the re-cooling time, TimeF represents the predetermined cooling time, TimeA represents the aftercooling time, V1 represents the first temperature difference, V2 represents the second temperature difference, and X represents the threshold.

18. The method of claim 17, wherein the aftercooling time represents an interval from power-off of the projector to complete loss of power in the projector.

19. The method of claim 17, wherein the aftercooling time represents an interval from power-on of the projector switched to a next power-on of the projector.

20. The method of claim 18, wherein if power-off of the projector occurs due to power-cut of the projector, the aftercooling time is equal to 0.

21. The method of claim 17, wherein step (d) further comprises:
   updating the aftercooling time to be 0 after the lamp is cooled.

* * * * *